United States Patent Office 3,788,998
Patented Jan. 29, 1974

3,788,998
CHLORINATED DIELECTRIC LIQUIDS
Jean Coquillion, deceased, by Marie-Josephe Coquillion, St. Didier au Mont d'Or, executrix, and Pierre Jay, Decines, France, assignors to Progil, Paris, France
No Drawing. Continuation of abandoned application Ser. No. 855,388, Sept. 4, 1969. This application Dec. 13, 1971, Ser. No. 207,563
Claims priority, application France, Sept. 11, 1968, 50,376
Int. Cl. H01b 3/18, 3/24
U.S. Cl. 252—65     12 Claims

ABSTRACT OF THE DISCLOSURE

Dielectric liquids for use in impregnating capacitors are described which comprise a mixture of isopropylchlorodiphenyls and optionnally chlorodiphenyls containing at least 50% by weight of 2,4'-dichlorodiphenyl substituted at least in part with an isopropyl radical and wherein the number of isopropyl radicals is between 0.3 and 1.5 and the number of chlorine atoms is 2, both calculated on each mole of chlorodiphenyl compounds in the mixture. A scavenger such as an opoxide, or a low quantity of silicone oil or a nonpolar diluent may be added.

SPECIFICATION

This is a continuing application of Ser. No. 855,388 filed Sept. 4, 1969, now abandoned.

The present invention relates to new dielectric liquids and more particularly to those containing alkylated chlorinated hydrocarbons. They are intended for the impregnation of electrical capacitors having dielectric spacers made of paper sheets, metallized-paper sheets, polyolefin films, referred to hereinunder as paper capacitors, metallized-paper capacitors and polyolefin film capacitors.

It is known that metallized-paper capacitors have several advantages over capacitors of the classical type made with nonmetallized paper. They have, especially, the ability to be self-regenerating. However, this property presents problems in the choice of dielectric liquids to be used in association with metallized-paper. During the self-regeneration phenomenon, impregnating agents undergo a partial decomposition due to the heat evolved during localized breakdowns. In a parallel way, as the metal layer used as a frame in this type of capacitor generally has some irregularity due to irregular structure of bearer-paper surface, the electric field between the frames is not uniform and the voltage gradient is locally much greater than the mean voltage gradient (defined by the ratio of applied voltage to dielectric total thickness). Because of this, in those condensers, electronic emission phenomena by electron wrenching, and discharge phenomena in gaseous bubbles take place, having a degradating action on the impregnating liquids.

For the reasons mentioned hereinabove, it is necessary to impregnate metallized-paper capacitors with dielectrics the degradation products of which have little effect upon the capacitor insulating resistance. Therefore, in the past natural or synthetic hydrocarbons, especially mineral oils, that are often complex mixtures of aliphatic and aromatic hydrocarbons, have been used in this field, which answer this requirement. On the contrary, the known chlorinated dielectrics, as for example chlorodiphenyls, the degradation of which involves hydrogen chloride formation, have not been used for this application, as, in the presence of this acid, the capacitors are almost instantaneously put out of service. However, the mineral oils have the disadvantage of possessing low dielectric constant, generally near 2.2 at room temperature. On the contrary it is known that the presence of chlorine in the molecules of organic compounds gives a high permittivity; so, it would be better to use chlorinated impregnating agents in metallized-paper capacitors.

An attempt has already been made in this direction and it has been suggested to impregnate this kind of capacitor with chlorinated diphenyls known as dielectrics, alone or in admixture with chlorobenzenes, and adding scavengers such as, for example, epoxidized compounds able to combine with the degradation products of the impregnating agents, especially with hydrogen chloride, and to suppress in this way their prejudicial effect. However, it has been established that this is not sufficient and does not give the desired results. Under those conditions, the lifetime of the capacitors is still very short. On the other hand, polyolefin film capacitors which have a very high dielectric strength have been known for some years. However these polyolefin films are uneasily wettable; therefor the usual impregnating liquids, such as trichlorodiphenyl, are not satisfactory because they do not wet sufficiently and do not penetrate through said films. An attempt has been made to make trichlorodiphenyl more proper for impregnating said films, by dissolving therein atactic polypropylene (U.S. Pat. 3,483,452). But the results were still not entirely satisfactory.

Finally it is known that some impregnating dielectric liquids crystallize when they are cooled or have a not very low pour point so that they cannot be used for impregnating capacitors which are intended to be placed under conditions of low temperature.

It is an object of the present invention to provide dielectric liquids usable to impregnate metallized-paper capacitors, which have a high permittivity and result in a long lifetime of said capacitors.

It is another object of the present invention to provide dielectric liquids which penetrate thoroughly through polyolefin films and are proper for impregnating polyolefin film capacitors.

It is still another object of the present invention to provide dielectric liquids which may be used for impregnating capacitors which are intended to be placed under conditions of low temperature.

These and other objects are obtained by providing dielectric liquids for impregnating capacitors which consist essentially of a mixture of compounds selected from the group consisting of isopropylchlorodiphenyls and isopropylchlorodiphenyls admixed with chlorodiphenyls, wherein the number of isopropyl radicals is comprised between 0.3 and 1.5 and number of chlorine atoms is about 2, both calculated on each mole of said compounds in said mixture, and wherein at least 50% by weight of said compounds are selected from the group consisting of 2,4'-dichlorodiphenyl and 2,4'-dichlorodiphenyl substituted with at least one isopropyl radical.

The important features are the number of isopropyl radicals, and the content of chlorine and of 2,4'-dichlorodipehnyl or derivatives—that is isopropylated 2,4'-dichlorodiphenyl—in the whole mixture. As said, the number of isopropyl radicals must be comprised between 0.3 and 1.5, calculated on each mole of compound in the mixture; but it is preferably from 0.6 to 1.4. This means that the liquids according to the invention contain chloridiphenyls having more or less isopropyl substituents in their molecule or being partly unsubstituted so that, each compound of the mixture may be considered as having a number of isopropyl substituents within the range just indicated. The content of chlorine must be substantially of 2 chlorine atoms, calculated on each mole of compound, in the same way as for the isopropyl radicals. The content of 2,4'-dichlorodiphenyl and/or derivatives in the whole mixture must be at least of 50% by weight, but may be greater and extend up to 100%. Accordingly the dielectric liquids according to the invention may consist solely of isomeric monoisopropyl 2,4'-dichlorodiphenyl, optionally with unsubstituted 2,4'-dichlorodiphenyl, particularly if the chosen number of isopropyl radicals is less than 1. But they more often contain several dichloro-diphenyl isomers, for example the 2,2'- and 4,4'-isomer, in addition to 2,4'-dichlorodiphenyl, these compounds being in part or wholly substituted with at least one isopropyl radical in their molecule so that the number of isopropyl radicals in the whole mixture, calculated on each mole of said compounds, be comprised within the range indicated hereinabove. They may also contain low proportions of monochlorodiphenyl and trichlorodiphenyl, isopropylated or not, provided the chlorine content of the whole mixture remain substantially, as a mean value, of 2 chlorine atoms for each mole of compound. They are substantially free of high chlorinated diphenyl derivatives, such as pentachloro- or hexachlorodiphenyl, this being important since, as it is known, these latter are not biodegradable. The dielectric liquids within the scope of the invention will be hereinunder referred to as "mixtures of chlorodiphenyl derivatives."

An easy way to prepare the dielectric liquids comprises reacting propylene with a chlorodiphenyl fraction having about 2-chlorine atoms calculated on each mole of chlorodiphenyl present therein, and containing at least 50% by weight of 2,4'-dichlorodiphenyl, at 150–200° C. under normal pressure, in the presence of a Lewis acid as catalyst, for example aluminum chloride until a number of 0.3 to 1.5 isopropyl radicals calculated on each mole of chlorodiphenyl compound present in the mixture is reached. Preferably the chlorodiphenyl fraction contains from 65 to 85% by weight of 2,4'-dichlorodiphenyl. Such chlorodiphenyl fractions and the processes for preparing them are described in U.S. Pat. 3,194,766.

It may be advisable to add a scavenger to the liquids according to the invention, especially when they are intended for the impregnation of metallized-paper capacitors. Preferably these scavengers are chosen among those of epoxide compounds type, which are soluble in chlorinated aromatic hydrocarbons; such as for example, phenoxy-propylene oxide, styrene oxide, diphenyl-ethylene oxide, liquid epoxy resins and other similar compounds.

The quantity of useful epoxide which must be added to the main constituent is generally low. In a general way a proportion of 0.1 to 5% by weight, with regard to the basic mixture of chlorodiphenyl derivatives is sufficient.

According to a variant, the dielectric liquids of the invention may also contain non polar organic diluents which may or not, by themselves, have dielectric properties. This dilution is above all advisable when the dielectric liquids according to the invention are intended to impregnate metallized-paper capacitors because this has the advantage of increasing the viscosity of the dielectric liquid and thus to reducing the sensibility thereof to contamination by the ionizable organic impurities present in capacitors. Thus those diluents may be, for example, alkylaromatic hydrocarbons, such as products of benzene alkylation by branched or linear olefins, as for example propylene tetramer or olefin oligomers as polyisobutylenes having a molecular weight of betwen 600 and 1400.

Diluent may represent up to 50% of the total weight of the final product. If a scavenger is added to the composition, the quantity thereof is calculated by taking into account the diluent weight and may be in the same range as indicated hereinabove.

When the dielectric liquids are intended to impregnate polyolefin film capacitors, it is rather advisable to add with them a low quantity of a silicone oil, soluble therein, which results in the decreasing of the surface-tension of the mixture; thus the polyolefin films are still more easily wetted. As a silicone oil, there may be introduced for example a polymethylphenylsiloxane in a quantity of 20 to 2000 parts per million (p.p.m.) with regard to the mixture of chlorodiphenyl derivatives.

The permissivity of the new dielectric liquids according to the invention which is generally between 6.1 and 6.3, is much higher than that of mineral oils used for the impregnation of metallized-paper capacitors. It is higher than that of trichlorodiphenyl and of the same order as that of the dichlorodiphenyl fractions having a high content of 2,4'-dichlorodiphenyl. But the mixtures of chlorodiphenyl derivatives according to the invention have a better wetting power towards solid dielectric materials such as polyolefin films than the aforesaid impregnating liquids. This power may be estimated by measuring the angle formed by the surface of a polyolefin film and the tangent to the curve of a drop of a liquid according to the invention, deposited on said surface: this angle is 36° whereas the angle of a trichlorodiphenyl drop is 48°. When 1000 p.p.m. of polymethylsiloxane is added to this liquid, as stated above, this angle becomes 21°.

The dielectric liquids according to the invention have a very low pour point, of the order of −30° C. (trichlorodiphenyl: −19° C.); therefore they are especially useful to impregnate capacitors which are intended to be placed under conditions of low temperature.

Finally they have a lower chlorine content per volume unit than the known chlorinated dielectric liquids; it is lower than 0.30 g./cm.$^3$ whereas the chlorine content of trichlorodiphenyl is 0.58 g./cm.$^3$. Therefore if they are degraded under the action of electric fields, less hydrogen chloride, which is harmful for the capacitors, is evolved than in the case of, for example, trichlorodiphenyl.

The dielectric liquids of the invention may be used to impregnate, according to the known techniques, paper capacitors, metallized-paper capacitors with or without an interpolated layer of non-metallized paper, polyolefin film capacitors with or without an interpolated layer of paper.

The examples given hereinafter are intended to illustrate the scope of the present invention and to emphazise the characteristics of capacitors impregnated with the hereinabove described dielectrics.

Example 1

A liquid according to the invention was prepared by reacting propylene and a chlorodiphenyl fraction containing 70% (weight) of 2,4'-dichlorodiphenyl, 20% of 2,2'-dichlorodiphenyl, 6.5% of 4,4'-dichlorodiphenyl and 3.5% of several monochloro- and trichlorodiphenyls. The reaction was made at 160° C. in the presence of aluminum chloride and propylene was introduced until the number of isopropyl radicals was about 1, calculated on each mole of chlorodiphenyl compound in the mixture. The properties of this product were the following:

Density at 20° C.: 1.18
Viscosity at 100° C.: 3.1 centistokes
Pour point=−30° C.
Permittivity at 20° C.: 6.23
Dissipation factor (tg δ) at 100° C. and under 50 Hz: 0.002

A series of 6 capacitors were made using dielectric spacers made of 2 polypropylene films, 15 microns thick, placed on each side of a kraft paper sheet for capacitors, 10 microns thick. They were impregnated at 70° C. under a pressure of $10^{-2}$ mm. Hg, after a drying stage; then they were maintained at a temperature of 90° C. during 4 hours under the normal pressure.

The dielectric losses of these capacitors were measured at 90° C. under a frequency of 50 Hz and a voltage of 1440 volts. It was remarked that they were little different from one to the other capacitor. Then they were submitted to an aging test of 500 hours, at 90° C., under 2,200 volts.

The mean values obtained, taking into account all capacitors were:

tg δ, immediately after impregnation: $6.1 \times 10^{-4}$
tg δ, after the aging test: $3.5 \times 10^{-4}$

Example 2

A series of 30 capacitors were made using a layer of zinc-metallized kraft paper for capacitors, having a density of 1.2 and a thickness of 16 microns. Drying and impregnation were then made under a vacuum of $10^{-2}$ mm. Hg, according to the usual technics for metallized paper capacitors. 15 capacitors were impregnated with a mineral oil of the classical type and another 15 with the product of Example 1, but this was diluted with 25% by weight of a fraction of benzene alkylation by propylene tetramer (boiling point: 200° C. under 18 mm. Hg) and was added with 0.40% by weight of 1-epoxyethyl-3,4-epoxy-cyclohexane.

The mean capacity of the devices impregnated with dielectric liquid according to the invention was 2.187 μF and 1.836 for the one of the devices treated with mineral oil, which represents an increase of 19.1%.

Then, after having placed all those capacitors under a direct voltage of 550 v. for 2 sec., then of 485 v. for 1 minute they have ben submitted to any one of the following aging tests, under alternating voltage:

aging under a voltage of 320 $V_{eff}$ at 85° C. for 250 hours
(10 devices tested for every impregnant)

aging under a voltage of 320 $V_{eff}$ at 25° C. for 250 hours
(5 devices tested for every impregnant)

A breakdown of a capacitor impregnated with mineral oil was noted in the aging test at 85° C. No breakdown of capacitor impregnated with the dielectric liquid according to the invention took place.

Table 1 hereinafter reproduces mean value of insulating resistances measured under 100 volts at 20° C. and dielectric losses measured at 100° C. and a frequency of 50 Hz.

TABLE 1

| Impregnation | Measurement period | Insulating resistance (δ×F) | Dielectric losses Measurement voltage gradient V/micron | tg Ω, $10^{-4}$ |
|---|---|---|---|---|
| Dielectric liquid according to the invention. | Before aging | 12,050 | 5 | 44.7 |
| | | | 15 | 41.5 |
| | After aging 85° C. | 3,910 | 5 | 39.2 |
| | | | 15 | 37.8 |
| | After aging 25° C. | 1,874 | 5 | 41.0 |
| | | | 15 | 38.5 |
| Mineral oil | Before aging | 15,810 | 5 | 32.4 |
| | | | 15 | 71.7 |
| | After aging 85° C. | 650 | 5 | 124.3 |
| | | | 15 | 134.4 |
| | After aging 25° C. | 10 | 5 | 195.1 |
| | | | 15 | 260.1 |

What is claimed is:

1. A dielectric liquid for impregnating capacitors consisting essentially of a mixture of compounds selected from the group consisting of isopropylchlorodiphenyl isomers and isopropylchlorodiphenyl isomers admixed with chlorodiphenyl isomers, wherein the number of isopropyl radicals is between 0.3 and 1.5 and the number of chlorine atoms is about 2, both calculated on each mole of said compounds in said mixture, and wherein at leat 50% by weight of said compounds are selected from the group consisting of the 2,4-dichloordiphenyl isomer and the isopropyl-2,4'-dichlorodiphenyl isomers.

2. A dielectric liquid according to claim 1 further comprising an epoxide scavenger selected from the group consisting of phenoxy-propylene oxide, styrene oxide, diphenylethylene oxide, liquid epoxy resins and 1-epoxyethyl-3, 4 epoxy cyclohexane.

3. A dielectric liquid for impregnating polyolefin film capacitors consisting essentially of a mixture of compounds selected from the group consisting of isopropylchlorodiphenyl isomers and isopropylchlorodiphenyl isomers admixed with chlorodiphenyl isomers, wherein the number of isopropyl radicals is between 0.3 and 1.5 and the number of chlorine atoms is about 2, both calculated on each mole of said compounds in said mixture, and wherein at least 50% by weight of said compounds are selected from the group consisting of the 2,4'-dichlorodiphenyl isomer and the isoprop1-2,4'-dichlorodiphenyl, said liquid containing further 20 to 2,000 parts per million of a silicone oil soluble therein.

4. A dielectric liquid according to claim 2 which contains further a non polar organic diluent selected from the group consisting of products of benzene alkylation by branched or linear olefins and olefin oligomers.

5. A dielectric liquid in accordance with claim 1 wherein the number of isopropyl radicals is 0.6 to 1.4.

6. A dielectric liquid in accordance with claim 1 consisting essentially of monoisopropyl-2,4'-dichlorodiphenyl.

7. A capacitor having a dielectric spacer impregnated with the dielectric liquid of claim 1.

8. In a method of impregnating capacitors with a dielectric liquid, the improvement comprising using, as said dielectric liquid, the dielectric liquid of claim 1.

9. A dielectric liquid in accordance with claim 4 wherein said non-polar organic diluent comprises a product of benzene alkylation by propylene tetramer.

10. A dielectric liquid in accordance with claim 4 wherein said non-polar organic diluent comprises polyisobutylene having a molecular weight of between 600 and 1400.

11. In a method of impregnating polyolefin film capacitors with a dielectric liquid, the improvement wherein said dielectric liquid is the dielectric liquid of claim 1.

12. In a method of impregnating metallized-paper capacitors with a dielectric liquid, the improvement wherein said dielectric liquid is the dielectric liquid of claim 1.

References Cited

UNITED STATES PATENTS

| | | | |
|---|---|---|---|
| 3,194,766 | 7/1965 | Coquillion | 252—66 |
| 2,172,391 | 9/1939 | Krase | 260—649 DP |
| 3,362,908 | 1/1968 | Polito | 252—65 |
| 3,424,957 | 1/1969 | Katchman | 252—66 X |
| 3,483,452 | 12/1969 | Thigpen | 252—66 |
| 2,810,770 | 10/1957 | Sanford | 252—63 X |
| 2,837,724 | 6/1958 | Cook | 252—63 X |
| 3,089,987 | 5/1963 | Schultz et al. | 317—258 |

FOREIGN PATENTS

| | | | |
|---|---|---|---|
| 501,745 | 3/1939 | Great Britain | 260—549 DP |

ROLAND E. MARTIN, JR., Primary Examiner

U.S. Cl. X.R.

252—66; 260—649 DP; 317—258